United States Patent [19]

Williams et al.

[11] Patent Number: 5,115,431
[45] Date of Patent: May 19, 1992

[54] METHOD AND APPARATUS FOR PACKET COMMUNICATIONS SIGNALING

[75] Inventors: Charles S. T. Williams, Palo Alto; Shrikanth S. Kattemalalavadi, San Jose, both of Calif.

[73] Assignee: Stratacom, Inc., Campbell, Calif.

[21] Appl. No.: 589,699

[22] Filed: Sep. 28, 1990

[51] Int. Cl.$^5$ ............................................. H04J 3/24
[52] U.S. Cl. .................................. 370/94.1; 370/99; 370/110.1
[58] Field of Search ................... 370/94.1, 85.1, 85.15, 370/110.1, 99

[56] References Cited

U.S. PATENT DOCUMENTS

| | | | |
|---|---|---|---|
| 4,491,945 | 1/1985 | Turner. | |
| 4,494,230 | 1/1985 | Turner. | |
| 4,499,576 | 2/1985 | Fraser. | |
| 4,534,024 | 8/1985 | Maxemchuk et al. | 370/85.2 |
| 4,757,529 | 7/1988 | Glapa et al. . | |
| 4,768,190 | 8/1988 | Giancarlo | 370/85.15 |
| 4,771,425 | 9/1988 | Baran et al. . | |
| 4,782,485 | 11/1988 | Gollub | 370/94.1 |
| 4,819,228 | 4/1989 | Baran et al. . | |
| 4,819,229 | 4/1989 | Baran et al. | 370/85.1 |
| 4,903,261 | 2/1990 | Baran et al. . | |

OTHER PUBLICATIONS

*Voice Packetization—Packetized Voice Networking Protocol* by the American National Standard for Telecommunications, pp. 9–18 (Apr. 11, 1989).

*IPX Systems Operations Guide,* Chapters 1 and 2 (Stratacom 1988).

Primary Examiner—Douglas W. Olms
Assistant Examiner—T. Samuel
Attorney, Agent, or Firm—Blakely, Sokoloff, Taylor & Zafman

[57] ABSTRACT

A packet format for accurately transporting signaling information in a packet network is described. The packet format comprises a burst count, a sequence number, a burst time, and a signaling status bit. The burst count is for indicating a burst to which the packet belongs. The sequence number is for identifying a first packet of the burst. The burst time is for selectably indicating (1) a time delay from onset to a packet node bus for the first packet of the burst and (2) a time interval between successive signaling bit transitions.

18 Claims, 8 Drawing Sheets

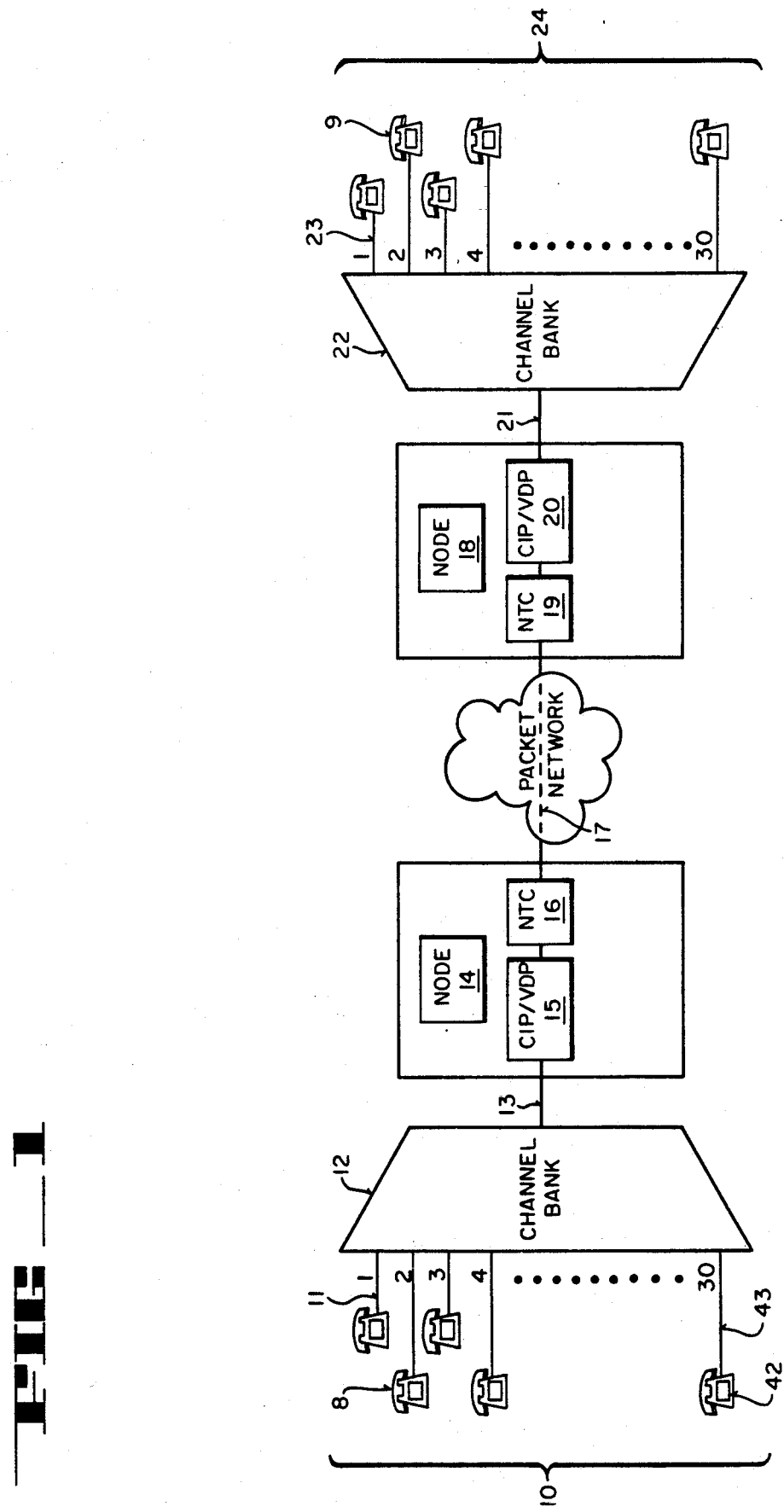

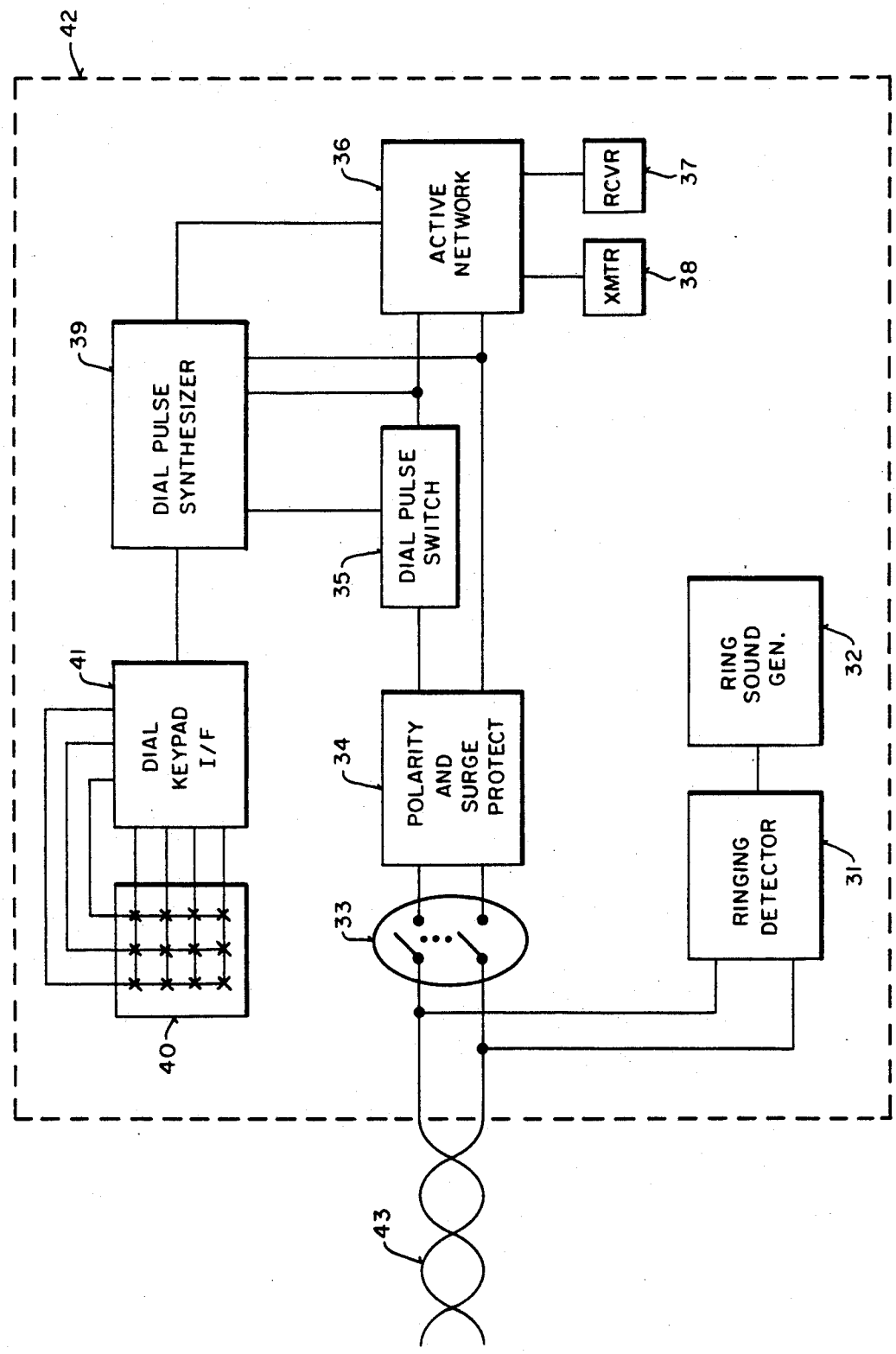
FIG.—2

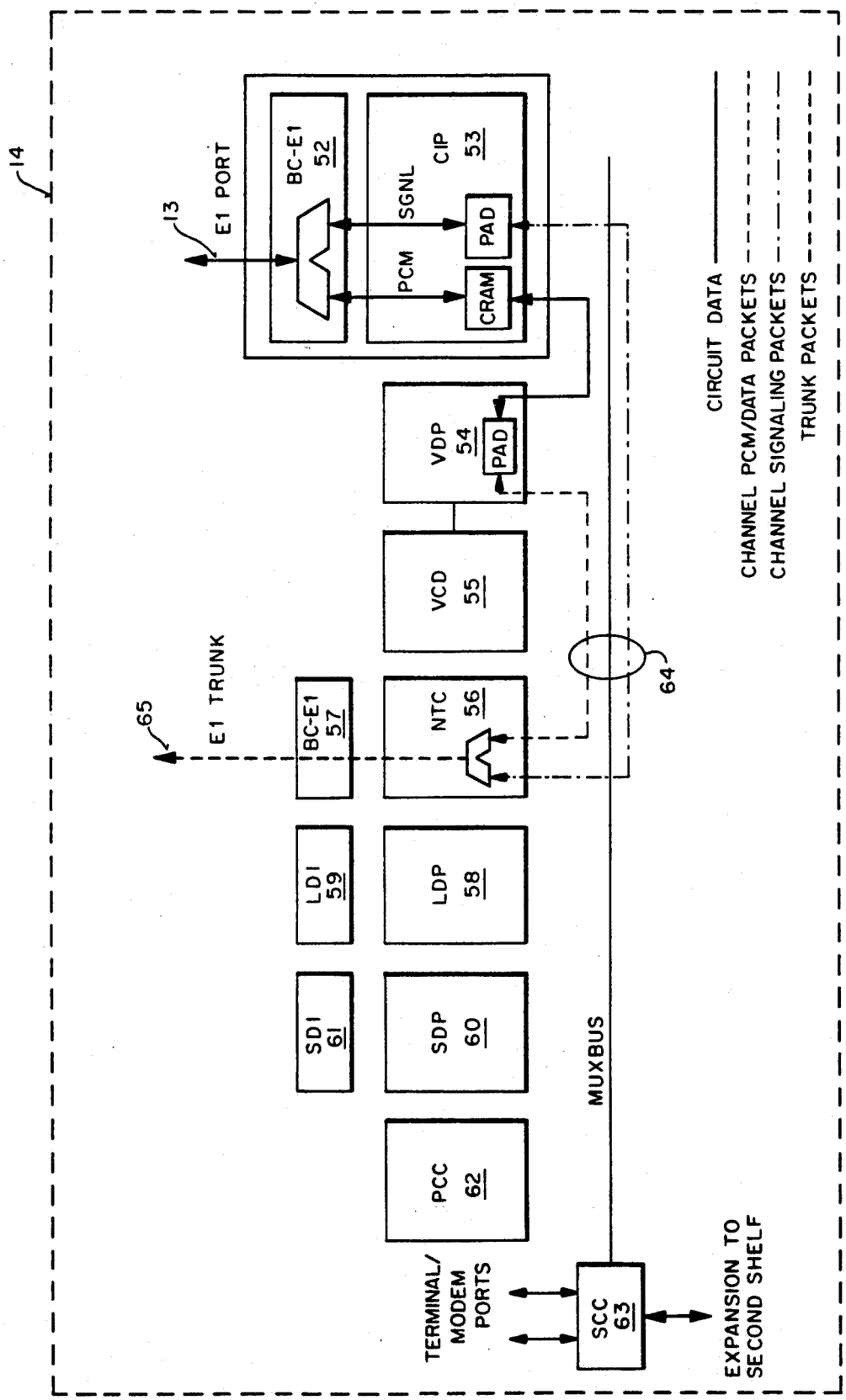
FIG_3

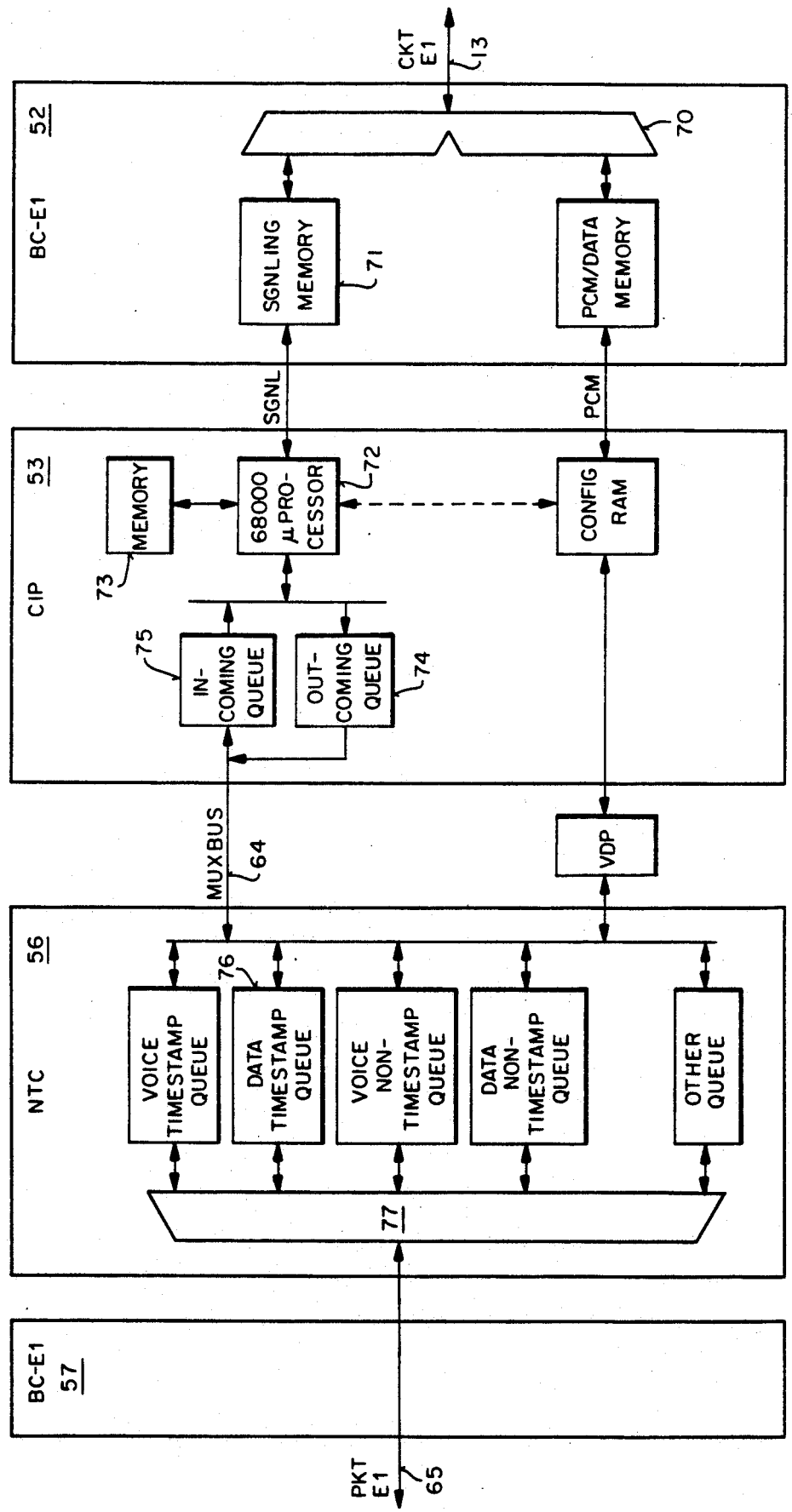
FIG_4

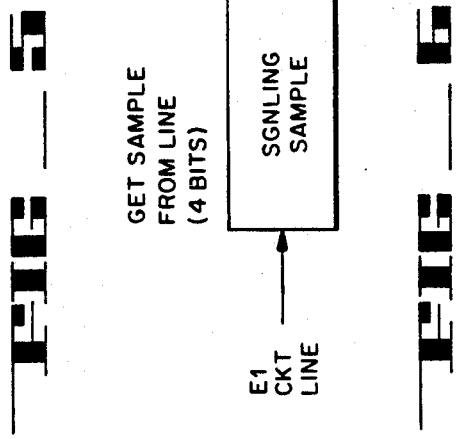
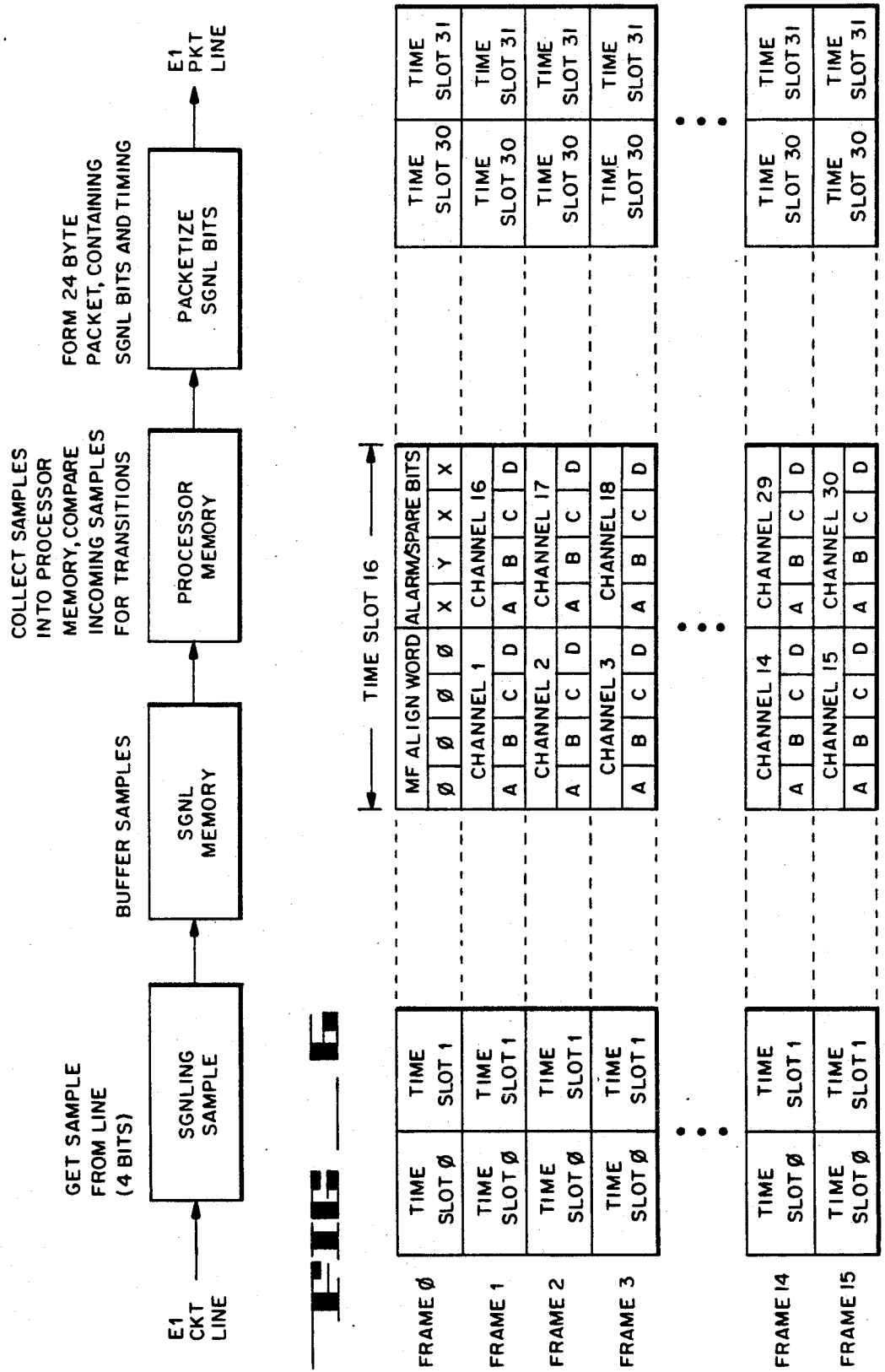

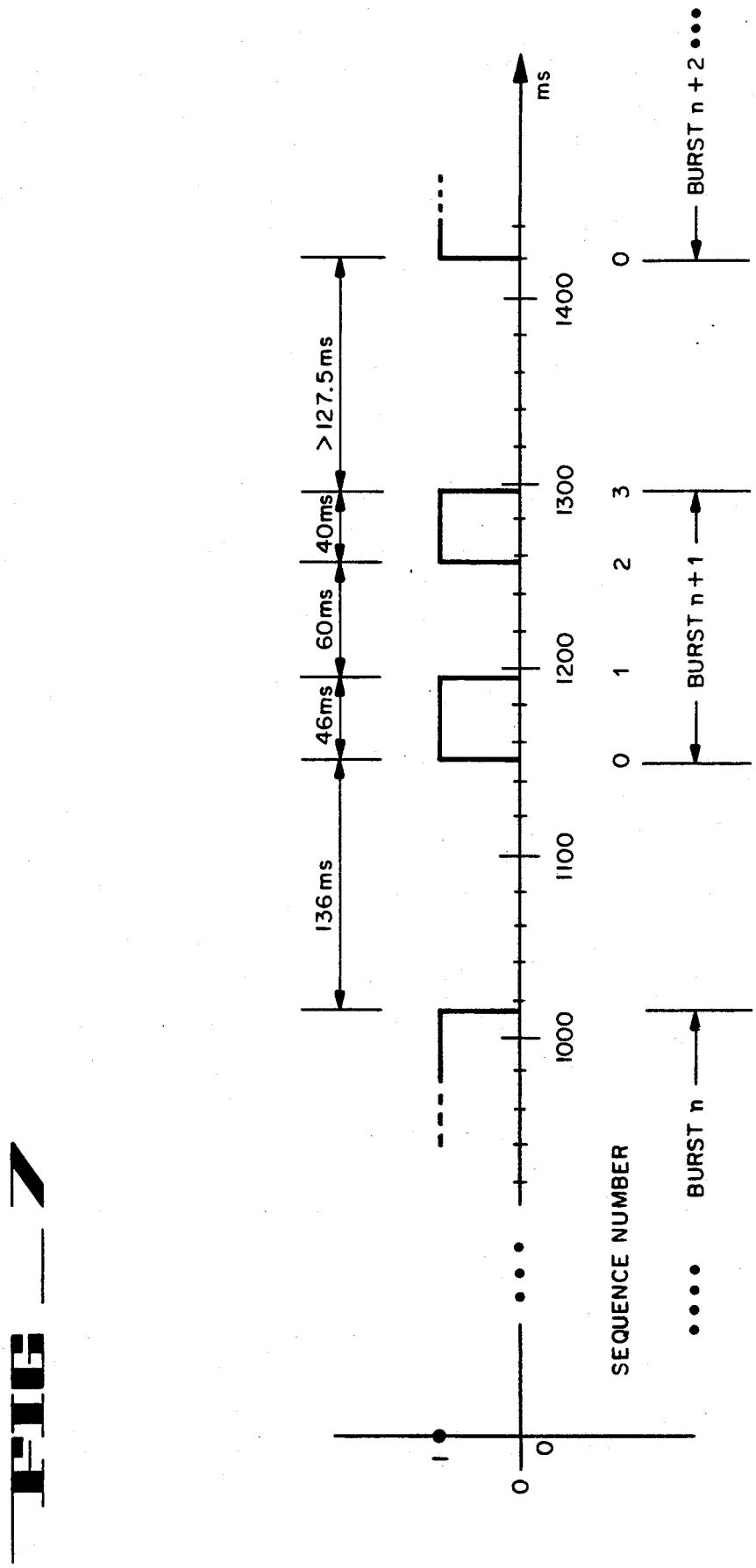
FIG_7

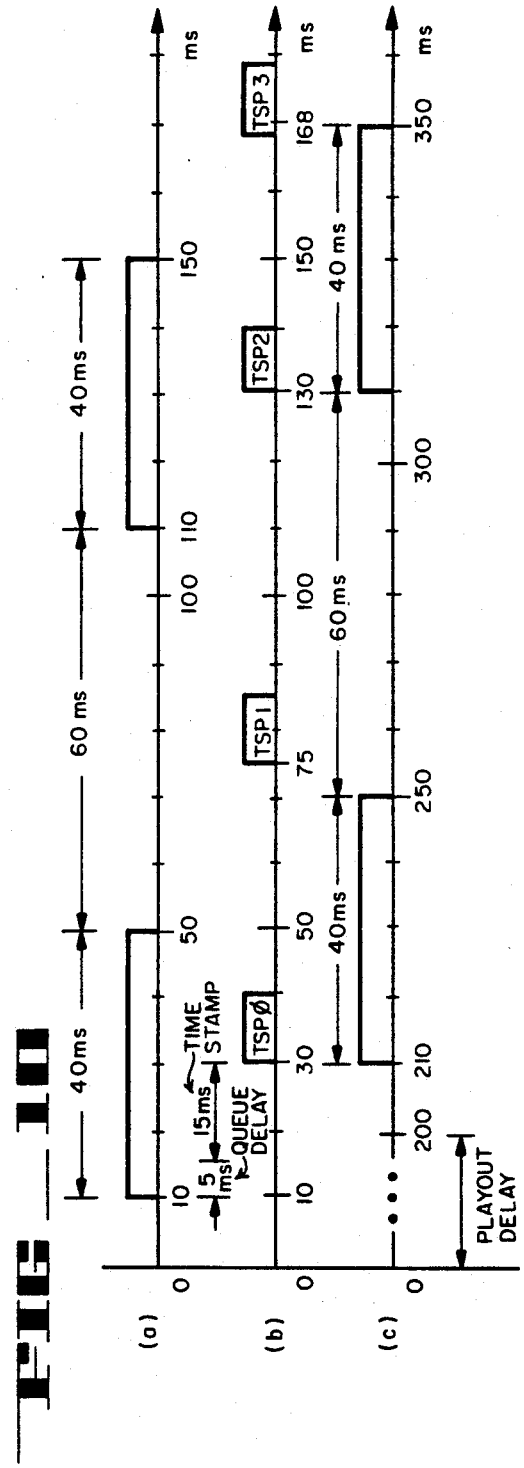

METHOD AND APPARATUS FOR PACKET COMMUNICATIONS SIGNALING

FIELD OF THE INVENTION

The present invention pertains to the field of telecommunications. More particularly, this invention relates to the encoding of dial-pulse telephone signaling signals for packet transmission and the packet decoding at the destination for recreation of the signaling signals.

BACKGROUND OF THE INVENTION

High speed digital private networks have expanded rapidly in the United States over the past several years due to the increased availability and declining cost of domestic common carrier T1 circuits. U.S. based corporate networks require extensions, however, to international locations where digital transmission circuits may be governed by different standards. These extended global networks need to be capable of integrating voice, with it associated signaling information, as well as data over high speed data lines allowing interconnection of computers and private branch exchanges ("PBXs") and other communication devices.

A typical global network today may use a mixture of T1 and fractional T1 digital or pulse code modulation ("PCM") trunks in North America as required by traffic between different network locations. The European portion may use a mixture of CEPT E1 and E1 subrate PCM trunks. This raises problems of interfacing these disparate trunks at their network nodes as well as the problem of interfacing voice signaling signals between terminal telephone equipment designed to operate with different signaling protocols. For example, problems arise when interfacing T1 lines operating at 1.544 Mbps and the European CEPT E1 lines operating at 2.048 Mbps where each system uses channel associated signaling ("CAS").

CAS signaling systems provide for the separation of voice and signaling waveforms. The signaling information is in the form of a two-level on-off signal representing receiver on-hook, receiver off-hook, station alerting "flash" (also referred to as a "wink"), and dial-pulses which encode destination address, i.e., dialed number information. It may be seen that timing of the transitions of the signaling waveforms is critical to the proper interpretation, for example, of a "flash" signal and a dial-pulse address sequence. Both North American and European standards call for similar telephone instrument signaling protocols.

When signaling information is combined with voice for transmission over a packet transmission line, compatibility problems can arise in the prior art due to the manner in which signaling information is packetized and combined with voice for transmission over a packet trunk. Voice data and signaling signals are transported in different packets which may result in some loss of synchronization between them. Although the timing relationship between the voice data and signaling signals is not critical, the timing relationship between successive transitions of the signaling waveforms is critical to their proper interpretation. Nondeterministic delays within the packet network can in the prior art introduce sufficient time-base distortion resulting in incorrect interpretation of the signaling data by the remote receiving equipment unless proper precautions are introduced in the packet system to ensure the signaling data integrity. In particular, nondeterministic delays within the packet network can in the prior art result in incorrect interpretations of dial pulse sequence data.

In addition, several different receiving end signaling protocols must be accommodated. For example, a T1 trunk with a D4 channel bank handles 24 voice channels, each channel sampling voice at 8000 samples per second which is combined with 24 channels of signaling data, with each channel sampled at 1.5 ms intervals. The T1-ESF trunk format specifics a 3 ms sampling interval for signaling data. European CEPT 30 channel trunk format requires a 2 ms signaling sampling interval.

SUMMARY AND OBJECTS OF THE INVENTION

In view of the growing need for accommodating mixed voice and data communications over network data trunks, one of the objectives of the present invention is to provide a bandwidth efficient method for sampling, digitizing and reconstructing signaling waveforms for packet communications systems.

Another objective of the present invention is to provide a signaling message format for packet communications that allows for the accurate reconstruction of signaling waveforms compatible with North America and international standards.

Another objective of the present invention is to provide the capability to handle multibit signaling information.

Another objective of the present invention is to accurately convey dial-pulse sequences which are used to route phone calls through the network and to convey other supporting signaling information.

A packet format for accurately transporting signaling information in a packet network is described. The packet format comprises a burst count, a sequence number, a burst time, and a signaling status bit. The burst count is for indicating a burst to which the packet belongs. The sequence number is for identifying a first packet of the burst. The burst time is for selectably indicating (1) a time delay from onset to a packet node bus for the first packet of the burst and (2) a time interval between successive signaling bit transitions.

Other objects, features and advantages of the present invention will be apparent from the accompanying drawings and from the detailed description which follows.

BRIEF DESCRIPTION OF DRAWINGS

The present invention is illustrated by way of example and not limitation in the figures of the accompanying drawings, in which like references indicate similar elements, and in which:

FIG. 1 is a block diagram of the signal flow of a telephone to telephone voice and data system.

FIG. 2 is a block diagram of an electronic dial-pulse telephone.

FIG. 3 is a block diagram of the signaling data flow of a packet node system.

FIG. 4 is a block diagram of the data flow of a packet channel interface port.

FIG. 5 is a block diagram of the signaling data flow of a channel interface port.

FIG. 6 shows the E-1 type voice and signaling frame format.

FIG. 7 shows an example of a burst sequence.

FIG. 8 shows the reconstruction of the sampled signaling waveforms.

FIG. 9 shows the transition state signaling packet format.

FIG. 10 shows the process of constructing signaling waveforms.

DETAILED DESCRIPTION

Figure 11:
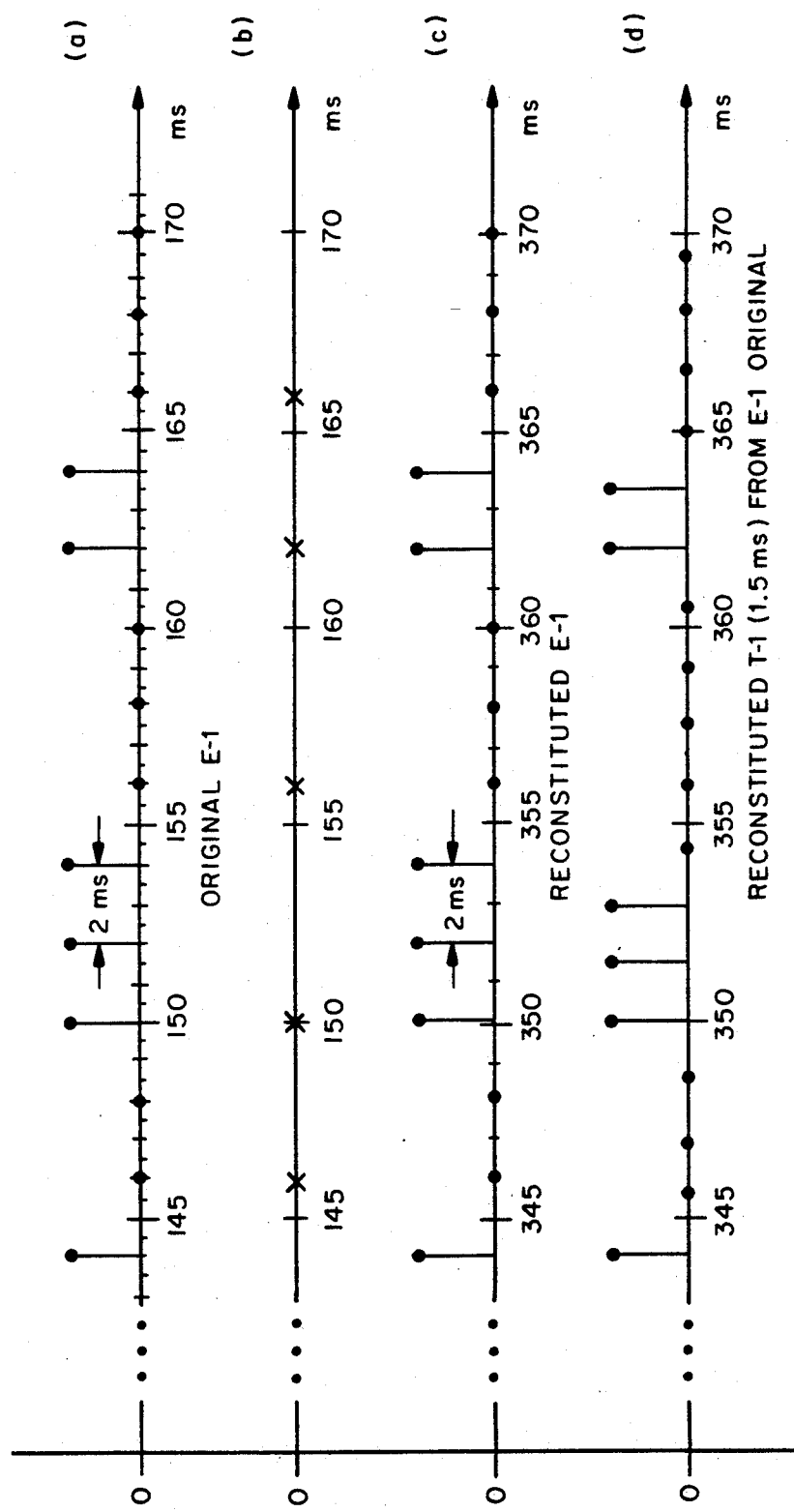

With reference to the drawings, FIG. 1 shows a block diagram of digital network processing systems 14 and 18 that are part of a telephone to telephone packet network 17. Digital network processing systems 14 and 18 are also referred to as packet network nodes 14 and 18.

In a preferred embodiment of the present invention, the digital network processing systems 14 and 18 each employ a transition state protocol that allows the relatively accurate transmission and reproduction of ABCD telephony signaling bits or states (described below) in packet network 17. The accuracy of the transition state protocol is especially important in the transmission and reproduction of dial-pulse sequences generated by telephones 10 and 24.

One type of dial-pulse sequences are the ones generated by rotary dial telephones. The dial pulse sequences comprise the "clicking" sounds one hears when one dials a rotary telephone. Certain types of more modern pushbutton telephones can also be configured to generate dial-pulse sequences.

Some European standards for the transmission and reproduction of dial-pulse sequences are quite rigorous to the extent that some European standards require that dial-pulse sequence accuracy be maintained to within 2 milliseconds when being transmitted and reproduced. The transition state protocol of the preferred embodiment of the present invention allows digital network processing systems 14 and 18 to meet the European standard with respect to dial-pulse sequences. Indeed, the accuracy of the TSP of the preferred embodiment of the present invention is limited only by the line sampling rate—for example, 1.5 milliseconds for north American T1 lines and 2.0 milliseconds for European CEPT (2.048 Mbs) lines. The TSP is described in more detail below.

The network processing system shown in FIG. 1 is the European version accommodating up to 30 telephones 10 as inputs to channel bank 12. The output data rate is 2.048 megabits per second for the voice data. The same principles, however, apply equally well to the T1 North American systems.

Telephone instruments 10 are connected by means of a twisted cable pairs 11 to a local channel bank 12. Channel bank 12 receives 30 twisted cable pairs 11 as inputs. Channel bank 12 separates the incoming signal into two parts: a voice signal and a signaling signal (e.g., a dial pulse signaling signal). A coder-decoder ("codec") (not shown) within channel bank 12 produces voice data by sampling, quantizing and compressing, the voice data into 8 bit words at a rate of 8000 samples per second for each incoming voice signal.

The 30 channels of voice data are also multiplexed by channel bank 12. Each voice channel is assigned a time slot in a 32 time slot frame for transmission at the output data link 13 of channel bank 12 as a time division multiplexed ("TDM") signal. The remaining two of the 32 time slots are assigned to line synchronization and housekeeping functions. Output data link 13 also carries 30 signaling channels, one from each of the telephone instruments 10.

Channel bank 12 scans lines 10 in a continuous round-robin fashion. An off-hook condition from telephone 8, for example, may initiate a call request. The dial pulses from telephone 8 that follow define the receiving telephone 9 to which telephone 8 is to be connected. These and other signaling waveforms are passed on through data link 13 to the packet network node 14.

Packet network node 14 properly formats the voice and signaling data for transmission over the packet network 17 and delivers the proper packets in proper order to the receiving packet network node 18. Packet node 18, channel bank 22, data link 21, lines 23, and destination telephone receivers 24 performs a mirrored symmetric inverse of the transmitting telephones 10, lines 11, channel bank 12, data link 13 and packet network node 14, thereby reconstructing the signaling and voice signals for the addressed telephones 24. In a similar manner, signaling and voice communications are established between telephones 24 and telephones 10, thus establishing a symmetric two-way telephone link. The telephones 10 may be considered to be actual telephone handsets or an interface to a telephone switching system, such as a PBX.

FIG. 2 shows a typical electronic dial-pulse telephone 42 that is connected to the local channel bank 12 by twisted-pair lines 43 that are part of lines 11 of FIG. 1. Channel bank 12 provides an omnipresent d-c voltage level on the twisted pair 30. Upon receiving a request for a connection, a low level, low frequency (approximately 20 Hz), a-c signal is superimposed on the d-c voltage by the local channel bank causing ringing detector 31 to cause ring-sound generator 32 to produce an audible ring signal. Picking up the receiver 37 causes switch 33 to close thereby establishing the connection and simultaneously supplying the d-c voltage to the telephone set through polarity guard and surge protection unit 34. The d-c return path is completed through dial-pulse switch 35 which is normally closed, and through the voice signal conditioning active network 36 and dial-pulse synthesizer 39.

The telephone 42 becomes a source of signaling information. When receiver 37 is lifted, d-c current flows indicating that the switch is closed. This is the off-hook condition, which causes ringing to cease. Returning the receiver to its non-operating position causes d-c current flow to cease. This is the on-hook condition. If the off-hook condition exists, then dial keypad 40, through the dial keypad interface 41 and dial pulse synthesizer 39, causes dial pulse switch 35 to open and close at approximately 9 to 11 pulses per second and with an off-on duty cycle ratio of 0.61±0.03 (as determined by standards and by the design of synthesizer 39). Thus, the basic signaling waveforms are synthesized and made available to the local channel bank.

FIG. 3 is a block diagram of the packet network node 14 of FIG. 1. Data from the channel bank 12 of FIG. 1 is supplied to interface unit 52 via data link 13. Interface unit 52 is also referred to as the E1 back card ("BC-E1"). The data on line 13 received by back card 52 contains multiplexed serial PCM 30 channel voice data at 2.048 mbps and 30 channels of dial-pulse signaling information. The voice data and signaling data are separately buffered in back card 52. The voice PCM data is then passed from interface unit 52 on to a channel interface port ("CIP") 53, where the data is routed to the VDP in preparation for formatting for packet transmission. Signaling data of all 30 channels is buffered by interface unit 52 and then passed on to CIP 53 for further packet processing and formatting, as subsequently described in detail.

Both data forms are communicated via bus 64 (known as the muxbus), which is a high speed 32 megabit per second system bus. Voice data is formatted in voice data processor ("VDP") 54. The formatted voice data and packet formatted signaling data are sent to the network trunk card ("NTC") 56 for buffering and formatting. The formatted voice data and signaling data is then transmitted on E1 packet network trunk 65 after passing through interface unit 57.

Packet network node 14 also includes circuitry for performing other functions. Voice compression/decompression ("VCD") card 55 changes voice PCM data from $\mu$-Law to ADPCM and vice-versa. Low speed data pad ("LDP") 58 and synchronous data pad ("SDP") 60, together with their corresponding interfaces LDI 59 and SDI 61, interface with RS-232 C/D and RS-422/449 data sources. Processor control card ("PCC") provides management control of the packet network node. System clock card ("SCC") 63 provides centralized clock generation and interfaces with external clock sources and network management ports. SCC 63 can be connected to terminals, modems, personal computers, and interfaces with network operators.

FIG. 4 is a detailed functional block diagram of those elements of FIG. 3 that pertain to the signaling data flow. Signaling and voice data are made available at interface 52 by data link 13, which is an E1 type trunk. The signaling channels are each sampled by demultiplexer unit 70 and buffered in signaling memory 71. The signaling data buffered in memory 71 updates each of the 30 signaling channels at intervals of 2.0 msec.

Each of the 30 signaling channels may have up to 4 binary channel signaling bits assigned A, B, C and D as bit identifying symbols, for the purpose of allowing up to 16 different signaling combinations for each telephone instrument. Bits A and B are adequate for most current signaling needs while bits C and D provide for future expansion of the signaling repertoire.

Microprocessor 72 is a 68000 microprocessor sold by Motorola Corporation of Schaumburg, Ill. Microprocessor 72 in CIP 53 scans signaling memory, at a per channel interval of 2 ms (for this particular CEPT E1 voice example) and performs an exclusive-or operation of the last buffer contents with the newest four signaling bits of data in order to determine if a transition has occurred in the state of any one of the four. If a change has occurred, a transition state packet ("TSP") is prepared that shows the new state of the four signaling bits and the time of the occurrence information, described below.

A TSP is a type of independently addressable data packet that is to be sent from node 14 to node 18 over packet network 17 of FIG. 1. In FIG. 4, the data packet is to be sent over trunk 65.

The TSP includes, among other things, a network timestamp, a burst count number, a sequence number, "ABCD" signaling bits, and a burst time index.

The network timestamp index (also simply referred to as a "timestamp") is a number that is changed as the transition state packet traverses the packet network to reflect the cumulative queueing delays experienced in the local, intermediate, and destination nodes.

The burst count number is a number assigned to each burst. A burst is defined as a collection of signaling transitions, wherein each transition occurs within a prescribed time interval of 127.5 milliseconds.

The sequence number is a number assigned to each TSP of a burst beginning with zero.

The "ABCD" signaling bits are in effect state bits. In one preferred embodiment of the present invention, the A and B bits indicate the following. If the AB bits are 00, that indicates an "on hook" condition of the telephone. If the AB bits are 01, that indicates an "off hook" condition of the telephone. If the AB bits are 10, that indicates that a destination number has been dialed, but the person calling is waiting for the destination telephone to go off hook. If the AB bits are 11, that indicates that the destination telephone has been answered and thus has gone off hook. The C and D bits are reserved for future use.

For the first packet of a burst, the burst time index represents the difference in time between the time when microprocessor 72 desires to send a signaling packet to muxbus 64 and the time that the signaling packet is actually transmitted on the muxbus 64, this is effectively the outgoing queue 74 delay (henceforth called outgoing queue delay). For subsequent packets in the same burst, the burst time index represents the time interval since the previous transition was detected, which represents the time between signaling state transitions.

If two successive transitions occur at an interval greater than 127.5 ms, an onset of a "burst" is declared by microprocessor 72 corresponding to the time of the last signaling state transition. Microprocessor 72 takes the following actions.

(1) Microprocessor 72 resets the network timestamp of the TSP to one. This, by definition, occurs at the time the packet is created.

(2) Microprocessor 72 resets the sequence number to zero. This defines the packet to be the first of a burst sequence.

(3) Microprocessor 72 increments the burst count number. If the pre-incremented number is 15 (base 10), then the next number is one. This precludes using zero, which guarantees at least one bit of the burst count number being a "1".

(4) Microprocessor 72 sets the "ABCD" signaling bits to the respective value of the most recent signaling bit states.

(5) Microprocessor 72 sets the burst time index to the anticipated outgoing queue delay. This is a muxbus 64 service delay dependent on the muxbus 64 bandwidth allocated to the CIP 53 card. The burst time index has a unit value equal to 500 microseconds.

(6) Microprocessor 72 constructs the remaining packet fields of the TSP with other prescribed information.

Microprocessor 72 then sends the TSP to outgoing queue 74 of CIP 53. The TSP is then sent to NTC 56 via muxbus 64.

NTC 56 connects node 14 with E1 packet trunk 65. NTC 56 includes several queues for the packets passing through NTC 56. NTC 56 provides for each packet passing through it onto packet trunk 65 a network timestamp index having a 250 microsecond resolution. The network timestamp in the packet represents the sum of the time the packet has spent in the source node and intermediate nodes of the packet network. In other words, the timestamp largely represents queueing memory delays.

The TSP is then sent by NTC 56 to interface 57, and then onto packet network E1 line 65.

FIG. 5 summarizes the signaling data flow through the packet network node 14.

The node 18 at the receiving end of the packet network has the same configuration as shown in FIG. 4.

The packet E1 trunk line 65 passes the data through the interface 57 to NTC unit 56 where it is demultiplexed by unit 77 into distinct packet queues representing the various packet priority forms allowed by the packet trunk protocol. Signaling information is parsed into the data time-stamp queue 76 and passed on to the incoming queue 75 of CIP unit 53 via system muxbus 64. Microprocessor 72 fetches the packet from queue 75 and, in cooperation with its memory 73, constructs an E1 format signaling frame which is passed on to the signaling buffer memory 71. The signaling buffer memory 71 data is combined with the PCM data memory in interface 70 and sent to the local E1 circuit trunk 13.

The E1 trunk 13 format is shown in FIG. 6 wherein successive E1 frames of 256 bits are represented by the downward, top to bottom order. Time slot 0 (TS0), the first element of each frame contains a standard E-1 8 bit synchronization character. Time slot 16 ("TS16") of each frame contains two 4 bit (ABCD) signaling bytes for two channels. The TS16 of the initial frame 0 is used to synchronize the remaining 15 frames.

The state of the ABCD bits are recovered from the time encoded state information contained in the received TSP packets, each time encoded state having been assigned in 0.5 ms increments. Hence the (virtual) image of the ABCD waveform may be reformed, in software, into the E-1 standard 2 ms interval.

The first frame signaling bytes are for channels 1 and 16. The second frame signaling bytes are for channels 2 and 17, and so on, until the sixteenth frame, wherein the signaling bytes are for channels 15 and 30. In this manner, a time division multiplexed (TDM) group of 16 frames is constructed from the combined voice and signaling packet information.

At the E-1 data rate of 2.048 Mbps, each frame represents a time interval of 0.125 ms so that a group of 16 frames (15 frames plus one synchronization frame) may be generated each 2 ms. Thus, the 2 ms E-1 signaling sampling rate for 30 voice channels is accommodated. Given the functional similarity, the T-1 24 channel requirements using 1.5 ms or 3.0 ms signaling update intervals may also be achieved.

Because the signaling information was assigned in 0.5 ms intervals, which is the least common factor for 1.5, 2.0 and 3.0 ms, the receiving node can easily reconstruct any of the three data formats independent of the originating channel bank format. For the example shown, the E-1 format is suitable for delivery from packet network node 18 to the E-1 channel bank 22 as shown in FIG. 1. The details of the TSP protocol required to achieve these results follows.

The channel interface port ("CIP") 53 of FIG. 4 uses the transition state packet ("TSP") protocol to transport channel associated signaling over the packet network. This is an acknowledgeless protocol that communicates the ABCD signaling bits on a per channel basis and is applicable to a T1 (1.544 Mbps) or a CEPT (2.048 Mbps) line.

As noted previously, the TSP is generated in response to a change (i.e. transition) of any or multiple ABCD signaling bits. This is a balanced protocol which means either end of the connection can initiate a packet transmission.

A TSP uses a time stamped data packet in order to provide accurate signaling reconstruction at the receiver. In addition, the TSP contains a burst time field that synchronizes a channel transition relative to the last received packet. This allows exact reproduction of the intertransition time, important for dial-pulse sequences.

A burst is a collection of sequential signaling transitions, each transition occurring within a prescribed time interval of the immediately previous transition. This prescribed time interval, known as the signaling delay interval is user configurable. In the preferred embodiment of the present invention, the signaling delay interval is set to 127.5 milliseconds.

A burst may be a single transition, or a series of transitions. Each signaling transition is sent immediately after its occurrence and is subject only to subsequent outgoing queue 74 delays. There is no limit to the number of TSPs in a burst. A burst is terminated upon detection of two consecutive signaling transitions not contained within a signaling delay interval. Under these conditions, the second transition becomes the first member of the next burst.

The TSP system does not depend on interpreting a signaling pattern, it is only directed to the faithful reconstruction of the signaling waveforms from the transition timing information. The beneficial result is a simplified implementation and a smaller end-to-end transmission delay because of the minimal processing required. The significance of this TSP protocol is that (1) it requires low bandwidth given that only transitions are transported and (2) it is transparent to most known signaling protocols using signaling bit states because the transition timing information is exactly transmitted for transitions occurring within the signaling delay interval. This includes telephone dial pulse sequences (i.e., transitions), which are common in most telephone networks.

FIG. 7 sets forth an example with respect to a dial pulse sequences. FIG. 7 shows an "E & M" type signaling that uses only the "A" signaling bit (of the "ABCD" signaling bits of the TSP) to convey its information. The time scale shown in FIG. 7 is in milliseconds.

In FIG. 7, the second transition from the left, occurring at time 1150 ms and labelled sequence number 0, is the beginning of a burst sequence. This is because the prior transition occurred 135 ms earlier, which would exceed the signaling delay of 127.5 ms of the preferred embodiment of the invention. Because it is the first transition of a new burst, it is assigned a message sequence number of 0 in the packet. The packet (i.e., TSP) transmitting this information would also have (1) a network timestamp indicating a 1 indicating the time of origin and (2) a burst time value equal to the outgoing queue delay. This burst time counter has a resolution of 500 μs. The burst number of the packet is incremented, say, from n to n+1 and the A bit is assigned the value 1. The BCD signaling bits are also set to their detected states and do not change states throughout this example.

The next transition occurs 46 ms later, well within the signaling delay limit of 127.5 ms, and initiates a new TSP. The new TSP is assigned sequence number 1 and the A bit is 0. The burst time counter is assigned a value of 90, representing the 45 ms interval. The burst count would remain unchanged. This process would continue up through the transition labelled sequence #3.

The following transition appearing at 1425 ms occurs outside of the signaling delay limit and is therefore the beginning of burst number n+2.

It may therefore be seen that the TSP generated in this manner has the necessary information to accurately represent (reconstruct) the signaling waveform that occurs within a burst interval. The interburst timing interval accuracy is limited to the network timestamp accuracy, which in turn is subject to roundoff error at every queue it flows through in the packet network.

FIG. 8 is an example of the method used to reconstruct the signaling waveform at the packet network receiving node. FIG. 8(a) shows the original sampled signaling waveform using the E-1 2 ms sampling intervals. The TSPs received at the destination packet node contain information about the transitions occurring at the times indicated in FIG. 8(b). This information is sufficient to reconstitute the sample waveform shown in FIG. 8(a), but additionally, it permits signaling information to be generated in accordance with either the European E-1 or the North American T-1 protocol.

At power-up initialization of the processor 72, the signaling memory 71 is assigned arbitrary "ABCD" signaling bit states. These states are maintained until the first TSP is received by processor 72. The initial TSP establishes the true initial signaling bit state, and this initial state is repeated at fixed intervals of 2 ms, until the next transition time is reached (or passed) at which time, the new state is used repeatedly, at the prescribed interval, until the next transition is reached. This process is indicated in FIG. 8(c) for the case where the signaling waveform is to be reconstituted as an E-1 European type using a 2 ms sampling interval. Similarly, FIG. 8(d) shows the results of reconstituting the information in the North American T-1 1.5 ms (and the attendant small loss in waveform accuracy).

It is by the examples shown in FIG. 7 and FIG. 8 that the preferred embodiment of the present invention is capable of providing a packet telephone system to accommodate a variety of signaling protocols on the same network by transmitting transition information with exact resolution so that protocols are transparent to the packet network. For transitions within the signaling delay interval and having equally spaced sampling intervals at both ends of the packet network (e.g. E-1 lines at both ends of the network), the resolution provides exact timing accuracy for transitions within the signaling delay interval.

The TSP format is shown in FIG. 9, wherein the numbers across the top indicate the bit number (0-7) while the vertical index (1-24) indicates byte number. Bit 7 of byte 1, representing the device address, is transmitted first. To ensure a one's density requirement on data trunks, required in the North American T1 trunk network, each byte in the TSP is designed so as to guarantee at least a single bit equal to "1". Also, the TSP is 24 bytes in length to conform with existing preferred embodiment fixed length packet size even through the actual information carried is less than 24 bytes.

The definition of the TSP content is as follows:

The DEVICE ADDRESS, CARD IDENTIFICATION ("CARD ID") and CHANNEL ADDRESS that comprise bytes 1 through 2 are simply addresses unique to a signaling (TSP) channel.

PACKET TYPE (Bits 5-7, Byte 3). The Packet Type defines the packet queue priority. A TSP uses the "Timestamped Data" type queue.

SLOT NUMBER (Bits 0-4 Byte 3). This is the slot number in the system bus backplane in which the CIP resides, and is used in debugging stray packets, assuming values between 1-15, and 17-31 (with slot 0 and 16 reserved for the PCC).

NETWORK TIMESTAMP (Byte 4). This is the network timestamp, and has a resolution of 250 $\mu$seconds. The source CIP initiates this field to "0×01", hexadecimal. This timestamp is changed as it traverses the network to reflect the cumulative (queueing) delays experienced in the local, intermediate, and destination nodes. The maximum Network Time Delay is a network wide parameter, but cannot exceed 64 milliseconds. Normally, if the timestamp value exceeds the assigned maximum value, the packet is dropped. This field is used to maintain timing between bursts of signaling packets.

MESSAGE HEADER (Byte 5). The TSP information is bundled into an HDLC-like message, which is contained in bytes 5 through 24. The message format is based on the HDLC format as implemented by the SDP control protocol. The TSP incurs the overhead of this general format in order to maintain compatibility with the SDP and other cards (should the need arise). The overhead is composed of the Message Type (Byte 5), Message Code (Byte 6), and 16 bit CRC (Bytes 23 and 24). This overhead provides a sequencing mechanism and error detection, in order to detect dropped or erroneous packets. The only Message Type used by the TSP is unsequenced information, which has a binary value of 111111ØØ, hexadecimal.

ZERO BYTES FLAG (Bit 7, Byte 6). This bit is used to flag zero bytes in the remaining message fields. Because the TSP is defined to contain only non-zero bytes, this field is always set to "0."

MESSAGE SEQUENCE NUMBER (Bits 4-6, Byte 6). This field is initialized to "0×0" at the beginning of a "burst" of packets. For every subsequent packet within the same burst, this count is incremented. When the sequence number reaches 7 and needs to increment, the next sequence number resets to one, thus skipping zero.

MESSAGE CODE (Bits 0-3, Byte 6). The Message Code identifies the TSP message format in reference to other packets using the same packet format.

TSP SIGNALING MESSAGE (Bytes 7-22). The TSP signaling specific message format are contained in these bytes.

BURST COUNT (Bits 4-7, Byte 7). This counter increments, Modulo-15 (skipping 0 as an invalid count), at the beginning of a "burst" of signaling information, and remains unchanged for subsequent TSPs of the same burst. This field is used to delimit burst intervals, and aid in detecting lost packets.

ABCD SIGNALING BITS (Bits 0-3, Byte 7). This field contains the value of the present state of the A, B, C and D channel signaling bits.

BURST TIME (Byte 8). This is an 8 bit, unsigned, non-zero value, with resolution of 500 $\mu$seconds. The first packet of a burst sets this field to a value equal to the delay since birth up to the time the packet is transmitted to the system bus. Subsequent packets, in the same burst, set this value to the time interval from the previously transmitted packet (i.e., integer number of 500 $\mu$seconds increments). This interval represents the time between signaling state transitions. Maximum burst time is the "Signaling Delay" interval value, and must be less than or equal to 127.5 milliseconds.

FILLER BYTES (Bytes 9-22). Unused bytes in the TSP are filled with "0×77", hexadecimal.

16 BIT CRC (Bytes 23-24). This is a 16 bit Cyclic Redundancy Check (CRC) over the message data bytes 5 through 22. The generating polynomial is $x^{16}+x^{12}+x^8+1$. When a final CRC byte is equal to "0×0", then that byte is set to "0×ff". Note that the CRC-16 is not performed over the first 5 bytes of the packet for two reasons: (1) the Slot Number/CRC-5 field in byte 3 is a variable that is overwritten after it leaves the CIP, and (2) the Network Time Stamp, i.e., Byte 4, is a variable which is changed as the packet traverses the network. Since these values are variable, it is improper for the transmitting CIP to include them in the CRC-16 when it forms the packet. However, the Device Address, Card Type, Channel Address, and Packet Type are all included in the CRC-5 resultant calculation field that is inserted into the Slot Number field during the transmission across the network trunk.

The destination CIP reconstructs the signaling waveform as follows:

1) When a TSP with Message Sequence Number equal to "0×0" is received, the signaling state is played out based on the Network Timestamp field and Playout delay parameter. That is, msec to hold packet before playout = [Playout Delay − Network Delay − Queue Delay]

where:
Network Delay = (Network Timestamp × ½) milliseconds
Playout Delay is programmed by PCC (taken in milliseconds) and must be set to be greater than the sum of the maximum expected Network Delay and Queue Delay (default is 200 milliseconds, but could be lower).
Queue Delay = (Burst Time × ½) milliseconds.

2) When a TSP with sequence number equal to 1 through 15 is received, the signaling bits state is played out based only on the Burst Time field. The procedure is described below:

a) Multiply the Burst Time by two (to form milliseconds); call this $t_{n+1}$;

b) Then $T_{n+1} = T_n + t_{n+1}$, there $T_n$ and $T_{n+1}$ are the time at which the previous and "just received" TSPs are to play out respectively.

3) The destination CIP plays out the most recent received state of the ABCD bits onto its channel signaling bit memory until another TSP (with different ABCD bits) is received.

4) In the case of a lost intermediate burst packet (of a multiple transition burst), or the case of an intermediate burst packet exceeding the maximum Signaling Delay at playout, then the Network Timestamp should be used to reconstruct the signaling.

It should be noted that the procedure for reconstructing the virtual waveform timing has two important parts:

1) establishment of the onset of a burst interval from TSP message sequence 0, relative to the absolute system clock by using the playout delay, timestamp, and the queue delay information to correct the arrival time;

2) establishment of intra-burst timing by using the burst time index of subsequent TSPs to establish their relative time intervals.

This procedure is shown in FIG. 10, where FIG. 10(a) represents a typical A bit waveform with the burst beginning at system time of 10 ms. FIG. 10(b) shows the time of arrival of the TSPs (message sequence numbers 0 through 3). The arrival time of TSP 0 is shown as 30 ms with a timestamp value of 15 ms and a queue delay value (represented by the burst time index) of 5 ms. This indicates that the initial transition occurred at 20 ms before the arrival of TSP 0 or at 10 ms on the system clock. The absolute time at which the signaling information is to send out is the time at which the initial transition occurred (10 ms) plus the playout delay of 200 ms, or 210 ms system time as indicated in FIG. 10(c). Subsequent transitions which occurred at intervals of 40, 60 and 40 ms as shown in FIG. 10(a) are then made to occur at the burst time intervals (contained in TSP1, TSP2, TSP3) relative to the first transition. Thus, the following transitions are timed to occur at 250, 310 and 350 ms in FIG. 10(c).

If the CRC comparison fails, the packet is ignored and a "CRC Error" statistic is asserted. This applies to all packets.

In the case of lost packets, a "heartbeat" TSP provides a mechanism for the protocol to enable recovery. The heartbeat TSP is used to correct the static signaling state in case the prior packet generated in response to a signaling transition is lost. The heartbeat packet containing the last detected ABCD signaling states, which is generated typically every 5 seconds during non transition intervals, can correct a lost packet problem.

In summary, apparatus, protocol and method have been described for transmitting and receiving telephone signaling information over a packet communication network that enables telephone systems, with different signaling protocols, to compatibly exchange signaling data while maintaining the full flexibility of the packet network. In particular, the system described provides for the accurate conveyance of dial pulse sequences.

In the foregoing specification, the invention has been described with reference to specific exemplary embodiment thereof. It will, however, be evident that various modifications and changes may be made thereto without departing from the broader spirit and scope of the invention as set forth in the appended claims. The specifications and drawings are, accordingly, to be regarded in an illustrative, rather than a restrictive, sense.

What is claimed is:

1. A method for encoding signaling transition information for transmission on a packet transmission network, comprising the steps of:

(a) generating a packet if a signaling transition has occurred;

(b) generating a burst count for the packet, wherein a burst is a collection of signaling transitions that occur within a predetermined time interval, wherein the burst includes at least one signaling transition, and wherein the burst count identifies the burst the packet is associated with;

(c) generating a sequence number for the packet to identify a sequence of the packet with respect to any other packet associated with the burst;

(d) generating signaling state information for the packet for indicating a state of a signal to be replicated;

(e) generating a burst time for the packet, wherein (1) if the packet is a first packet of the burst, then the burst time approximately indicates a time from a time that transmission of the packet is desired to a time that the packet is transmitted; and (2) if the packet is not a first packet of the burst, then the burst time indicates a time since a previous signaling transition.

2. The method of claim 1 for encoding signaling transition information for transmission on a packet transmission network, further comprising a step of generating a timestamp for the packet for indicating cumulative delays for the packet in traversal of the packet transmission network, wherein the timestamp is set to a first value when the packet is generated.

3. The method of claim 1 for encoding signaling transmission information on a packet transmission network, wherein the signaling state information for the packet indicates a state of a telephone signal, and wherein the signal to be replicated is a telephone signal.

4. The method of claim 1 for encoding signal transmission information on a packet transmission network, wherein the signaling state information for the packet comprises a single bit.

5. The method of claim 1 for encoding signal transmission information on a packet transmission network, wherein the signaling transmission information comprises a plurality of bits.

6. The method of claim 1 for encoding signal transmission information on a packet transmission network, wherein the step of generating signaling state information comprises:
   (1) setting the signaling state information to a first value if a telephone is on hook; and
   (2) setting the signaling state information to a second value if the telephone is off hook.

7. The method of claim 6 for encoding signal transmission information on a packet transmission network, wherein the step of generating signaling state information further comprises:
   (3) setting the signaling state information to a third value if a telephone number of a destination telephone has been dialed but the destination telephone has not yet gone off hook; and
   (4) setting the signaling state information to a fourth value if a telephone number of a destination telephone has been dialed and the destination telephone has gone off hook.

8. The method of claim 1 for encoding signaling transmission information on a packet transmission network, wherein a first packet of a burst has a burst count of one and a sequence number of zero.

9. The method of claim 1 for encoding signaling transmission information on a packet transmission network, wherein the predetermined time interval is 127.5 milliseconds.

10. A method for decoding signaling transition information received from a packet transmission network, comprising the steps of:
    (a) receiving a transition state packet from the packet transmission network, wherein the transition state packet includes:
       (1) a burst count, wherein a burst is a collection of signaling transitions that occur within a predetermined time interval, wherein the burst includes of at least one signaling transition, and wherein the burst count identifies the burst the transition state packet is associated with;
       (2) a sequence number that identifies a sequence of the transition state packet with respect to any other packet associated with the burst;
       (3) signaling state information for indicating a state of a signal to be replicated;
       (4) a burst time, wherein
          (A) if the transition state packet is a first transition state packet of the burst, then the burst time approximately indicates a time from time that transmission of the transition state packet was desired to a time that the transition state packet was transmitted; and
          (B) if the transition state packet is not the first transition state packet of the burst, then the burst time indicates a time since a previous signaling transition;
    (b) decoding the sequence number of the transition state packet;
    (c) if the sequence number indicates that the transition state packet is the first transition state packet of the burst, then
       (1) delaying for a time based upon the burst time of the transition state packet;
       (2) generating a signal state until a next signaling transition time, wherein a level of the signal state is based upon the signaling state information of the transition state packet; and
    (d) if the sequence number indicates that the transition state packet is not the first transition state packet of the burst, then generating a signal state until a next signaling transition time, wherein a level of the signal state is based upon the signaling state information of the transition state packet.

11. The method of claim 10 for decoding signaling transition information, wherein the next signaling transition time is determined by the burst time of a next transition state packet.

12. A method for reconstructing a waveform, comprising the steps of:
    (a) sampling the waveform;
    (b) generating a packet for a transition of the waveform;
    (c) generating a burst count for the packet, wherein a burst is a collection of each waveform transition that occurs within a predetermined time interval, wherein the burst is comprised of a least one signaling transition, and wherein the burst count identifies the burst the packet is associated with;
    (d) generating a sequence number for the packet to identify a sequence of the packet with respect to any other packet associated with the burst;
    (e) generating state information for the packet for indicating a state of a waveform to be replicated;
    (f) generating a burst time for the packet, wherein
       (1) if the packet is a first packet of the burst, then the burst time approximately indicates a time from a time that transmission of the packet is desired to a time that the packet is transmitted;
       (2) if the packet is not a first packet of the burst, then the burst time indicates a time since a previous signaling transition;
    (g) transmitting the packet on a packet transmission network;
    (h) receiving the packet from the packet transmission network;
    (i) reconstructing the waveform, comprising the steps of:
       (1) decoding the sequence number of the packet;
       (2) if the sequence number indicates that the packet is the first packet of the burst, then
          (A) delaying for a time based upon the burst time of the packet;
          (B) generating a waveform until a next waveform transition time, wherein the waveform is based upon the state information of the packet;
       (3) if the sequence number indicates that the packet is not the first packet of the burst, then generating a waveform until a next waveform transition time, wherein the waveform state is based upon the state information of the packet.

13. A method of encoding a telephone signaling waveform for transmission as packets, comprising the steps of:
   a. sequentially storing samples of the telephone signaling waveform;
   b. comparing the sequentially stored samples to a first sample having a first occurrence time to identify a second sample having a second occurrence time, said second sample indicating a change in said telephone signaling waveform;
   c. determining a time interval between said first occurrence time and said second occurrence time;
   d. if said time interval does not exceed a predetermined limit:
      i. associating said time interval as a burst time with said second sample,
      ii. incrementing a message counter to a first message count,
      iii. associating said first message count with said second sample,
      iv. associating a first burst count from a burst counter with said second sample;
   e. if said time interval exceeds said predetermined limit:
      i. associating said predetermined limit as said burst time with said second sample,
      ii. resetting said message counter to an initial message count,
      iii. associating said initial message count with said second sample,
      iv. incrementing said burst counter to a second burst count,
      v. associating said second burst count with said second sample; and
   f. formatting said second sample and said associated burst count, message count, and burst time into a packet for transmission.

14. An apparatus for encoding signaling transition information for transmission on a packet transmission network, comprising:
   a) a memory storing signaling transition information;
   b) means for constructing packets from said signaling transition information, said packets including:
      1) a burst count for the packet, wherein a burst is a collection of signaling transitions that occur with a predetermined time interval, wherein the burst includes at least one signaling transition, and wherein the burst count identifies the burst the packet is associated with,
      2) a sequence number for the packet to identify a sequence of the packet with respect to any other packet associated with the burst,
      3) signaling state information for the packet for indicating a state of a signal to be replicated,
      4) a burst time indicating
         A) approximately a time that transmission of the packet is desired to a time that the packet is transmitted if the packet is a first packet of a burst,
         B) a time since a previous signaling transition if the packet is not the first packet of the burst; and
   c) means for connecting the packets to a trunk.

15. The apparatus of claim 14 wherein the means for constructing packets comprises a microprocessor.

16. The apparatus of claim 14 further comprising a demultiplexer coupled to said memory, the demultiplexer receiving signaling transition information for a multiplicity of channels.

17. An apparatus for decoding signaling transition information received from a packet transmission network, comprising:
   a) means for receiving packets from a trunk;
   b) means for constructing signaling transition information from packets, said packets including:
      1) a burst count for the packet, wherein a burst is a collection of signaling transitions that occur with a predetermined time interval, wherein the burst includes at least one signaling transition, and wherein the burst count identifies the burst the packet is associated with,
      2) a sequence number for the packet to identify a sequence of the packet with respect to any other packet associated with the burst,
      3) signaling state information for the packet for indicating a state of a signal to be replicated,
      4) a burst time indicating
         A) approximately a time that transmission of the packet is desired to a time that the packet is transmitted if the packet is a first packet of a burst,
         B) a time since a previous signaling transition if the packet is not the first packet of the burst; and
   c) a memory storing signaling transition information.

18. The apparatus of claim 17 wherein the means for constructing signaling transition information from packets comprises a microprocessor.

* * * * *